United States Patent Office 2,887,361
Patented May 19, 1959

2,887,361

PURIFICATION OF ALUMINA

Michael John Fenerty, Arvida, Quebec, Canada, assignor to Aluminium Laboratories Limited, Montreal, Quebec, Canada, a corporation of Canada No Drawing. Application October 24, 1956
Serial No. 617,946

8 Claims. (Cl. 23—142)

This invention relates to the purification of alumina and particularly to the production of alumina having a low content of soda, the latter term being employed to mean sodium in combined form. Sodium compounds in alumina are conventionally referred to as soda (sodium oxide, $Na_2O$) whether or not the sodium is present in such form.

For various purposes alumina, e.g. calcined alumina, is required to have a very low content of soda, for example when it is employed as a major constituent in high grade ceramic bodies, such as spark plug insulators. A common source of alumina is alumina trihydrate as produced by the Bayer or similar procedures wherein bauxite or other aluminous material is treated to yield a solution of sodium aluminate, from which the alumina trihydrate is precipitated and separated. The trihydrate is usually calcined to provide anhydrous alumina, but such produce often has a soda content, e.g. 0.4 to 0.6% and upwards (measured as $Na_2O$ on the basis of $Al_2O_3$), which is much too high for use in ceramics for spark plugs and a number of other purposes.

Various methods have been proposed for reducing the amount of soda in alumina, one convenient type of procedure being designed or intended to remove at least some of the soda during the calcination of the alumina trihydrate. For example, it has been proposed to mix the trihydrate with a small proportion of boric oxide, i.e. in the form of boric acid, and then to subject the material, containing the boric acid, to calcination by the usual process of feeding it counter-currently to a flow of hot gas in a rotary kiln. Another treatment of alumina trihydrate in the calcining operation has involved first mixing the trihydrate with a small amount of aluminum fluoride and then subjecting the material to calcination as in the conventional manner described above. This last-mentioned process, however, has been primarily directed to the rapid achievement of certain physical characteristics in the alumina. Indeed it has now been observed that the use of aluminum fluoride in the described manner, i.e. by adding it to the alumina trihydrate before or as the latter is supplied to the feed end of a rotary kiln, is not successful in producing low soda alumina. Moreover, difficulties in efficiency or effectivness also appear to exist in the operation first outlined above, i.e. when boric acid is added to the trihydrate as the latter is introduced at the feed end of the kiln.

The process of the present invention is based on the discovery that superior results may be obtained by feeding an additive, particularly aluminum fluoride, into the opposite or hot end of the kiln, especially by supplying the additive in finely divided form in the hot gases which are passed in a countercurrent direction relative to the alumina trihydrate. Under such circumstances the fluoride is found to remove soda, to a significant extent. A convenient mode of operation is to inject the additive compound into the primary air supplied to the burner, e.g. where the kiln is of a direct fired type; the additive is thus carried by the flame and hot gas into the oncoming trihydrate or partly calcined alumina. It may be explained that although the improved process is very advantageous for treating alumina trihydrate, in its broader aspects it is not confined to the use of the trihydrate as the starting material. Thus the process may be applied to the reduction of the soda content in alumina of any degree of hydration (from zero upward), i.e. in partially or fully calcined alumina; such materials are fed into the kiln in the same way. Hence in general where the starting material is described herein simply as alumina, it will be understood that such term includes the trihydrate and means alumina of any degree of hydration as just explained.

While the process is, as indicated, of special significance with the use of aluminum fluoride, corresponding procedure with substantial advantage is applicable to the introduction of other additives or mineralizers such as stated below. Likewise while operation in a rotary kiln represents an unusually effective embodiment of the process, other instrumentalities can be employed wherein the finely divided alumina trihydrate is brought up to a high temperature while it is continuously advanced along a predetermined path, the additive being introduced in a dispersed state into the heated alumina for effectively thorough and immediate contact with the latter at the high temperature. For instance, in a fluidizer, where the alumina is calcined by bringing it into a state of fluidization in a gaseous carrier with appropriate application of heat to the carrier or to the traveling, fluidized mass, the additive such as aluminum fluoride can be introduced into the heated fluidized stream as by suspending the additive in a supplemental flow of gas which is then injected into such stream.

The following are some specific advantages of the process, especially as realized in the preferred operation of introducing the additive with the gas or flame at the hot end of a rotary kiln wherein the alumina, e.g. introduced as alumina trihydrate, flows countercurrently to the heated gas for calcination:

(1) Low soda alumina may be produced more readily than when the additive is fed at the cold end of the kiln or is otherwise initially mixed with the relatively cold trihydrate. Indeed, as explained, attempts to produce low soda alumina by feeding aluminum fluoride at the cold end of the kiln have not been found successful.

(2) Excellent crystal development of the alumina product is obtained, for example in that the resulting alumina is recovered in the form of relatively large, plate-like or platey monocrystals, representing a form particularly suitable for the requirements of use of this material (as in ceramics), with good purity and stability against re-hydration.

According to present understanding, the superior results obtained with this process appear to arise largely as follows: In the first place when this process is used the cold end dust, being the dust carried through and discharged at the cold end of the kiln in the passing gas, may be discarded without losing excessive quantities of unreacted additive. This dust or gas effectively carries sodium compounds from the kiln, i.e. as produced in vaporized (gaseous) or extremely fine solid form from the reaction between the additive and the soda contamination of the alumina. When an additive is fed at the cold end of the kiln along with the unheated alumina trihydrate, experience has been that the additive tends to find its way very quickly into the draft of gas, i.e. the combustion gases, so that there is serious loss of additive, the effect being indeed such that it may be essentially impossible, at least in any efficient manner, to achieve a significant reduction in the soda content of the alumina. This loss of additive is, as stated, very greatly reduced, or essentially avoided, by the present process.

In the second place, in the present process the additive has the opportunity of reacting with all the alumina, including dust, in the high temperature zone of the kiln. Thus when the additive is fed at the hot end, with the flame, it has the opportunity, first, to react quickly with the local dust, while the remainder and major part of the additive is then filtered, so to speak, out of the combustion gas, by the oncoming alumina material. Thus the additive becomes mixed with the mass of alumina as it travels to and reaches the highest temperature zone, so that most effective reaction (to release soda compounds) can take place. In contrast, when the additive is fed at the cold end of the kiln there is not only a tendency to excessive loss of the additive, but also little or no interaction between the remainder of the additive and the alumina dust in the high temperature zone (which ultimately settles there to become part of the product) because the additive only reaches the latter zone while mixed with the alumina on the bed of the kiln.

It is therefore to be seen that the present process affords an unusually effective reaction between the additive and the alumina trihydrate, to the effect that everything discharged at the hot end has been subjected to the treatment, and there is little or no waste of the additive in the gas and dust leaving the cold end. In consequence both the removal of soda and the mineralizing effect of the additive are more complete, yielding a purified product of unusually desirable physical form.

For further understanding of the invention, a comparative example is first noted, employing the prior procedure of feeding the additive and trihydrate together at the cold end of the kiln. In this operation, a mixture of finely divided alumina trihydrate and finely divided aluminum fluoride, the latter in amount equivalent to 4.5% of the alumina (this and all other amounts herein being stated by weight), was fed into the cold end of a rotary kiln that was arranged in conventional manner to slope slightly downward toward its opposite end. This feed was effected at a rate of 5 tons per hour ($Al_2O_3$ basis), the material traveling countercurrently through the kiln, which was approximately 200 feet along and which was direct fired with an oil flame (projected into the kiln) at the hot end. The temperature of the alumina in the bed of the kiln at the most highly heated zone was approximately 1400° C. In accordance with prior practice and with the view of utilizing the additive to the fullest extent possible, a certain amount of dust collected from the gases discharged at the cold end was collected in so-called multiclone dust collectors and was returned to the kiln with the feed. The alumina trihydrate of the feed had a soda content of approximately 0.5 to 0.6%. Over an 8 hour run, the average soda content of the product alumina was 0.48% $Na_2O$; from the considerable number of samples tested, as derived at various times during the run, the lowest soda content was 0.43% $Na_2O$.

By way of specific example of the invention, and in contrast to the above instance of prior practice, similar alumina trihydrate was fed into the cold end of a rotary kiln of the same type at 5 tons per hour ($Al_2O_3$ basis), so as to travel countercurrently to the hot gases. Aluminum fluoride, in the form of a fine powder and in amount equivalent to 4.8% of the alumina in the trihydrate feed, was injected into the so-called primary air at the hot or firing end of the kiln, i.e. into the air which was directed into the flame-producing nozzle of the burner. The temperature of the alumina mass in the hottest zone of the kiln was about 1400° C. In this instance, the dust collected from the feed or cold end was rejected. Over a run of 6 hours, the alumina produced, i.e. discharged at the hot end, was greatly purified with respect to soda contamination and showed an average content of only 0.1% soda ($Na_2O$). Representative samples of the discharged alumina, taken at various times during the run, showed the following percentages of soda: 0.10, 0.02, 0.09, 0.11, 0.13 and 0.19%. All of the product was well recrystallized alpha alumina, with an average size of monocrystals of 10 microns; the crystallization of the product was distinctly superior to that resulting from the operation involving cold end feeding.

A sample of dust removed from the dust collectors that received the flue gas from the cold end of the kiln in this example of the invention, was subjected to X-ray examination. The X-ray diffraction pattern showed that the dust had a very considerable content, i.e. about 20%, of cryolite, which is sodium aluminum fluoride ($Na_3AlF_6$). It is thus apparent that in the process of the invention, the aluminum fluoride was unusually effective in driving off soda, the latter being converted to the cryolite form and appearing in the removed gases, e.g. as a part of the dust in the collectors.

Although the use of aluminum fluoride in the described process is in itself a special feature of invention, the procedure is applicable, as explained above, to other additives such as stated below, these materials being conveniently defined as mineralizers which have the special capability of reaction with soda contamination of alumina at high temperature to yield a product removable with the kiln gases. Further examples of mineralizers having such capability and suitable as additives in the present process are hydrofluoric acid and other fluorides such as ammonium fluoride.

By utilizing the process, it appears that even a trace of aluminum fluoride will remove up to an equivalent of soda in the form of cryolite but the mineralizing additive is very preferably used in amounts of the order indicated above, e.g. aluminum fluoride in quantity equal to about 4% to 6% of the weight of alumina in the kiln feed. In general, useful results, with reasonable economy, can be achieved by employing aluminum fluoride from 1% to 10% of the weight of alumina in the kiln feed or corresponding amounts of other mineralizers, i.e. with suitable regard for the specific reactive effect of each.

Experience indicates that suitable operating temperatures lie in the range of 1000° C. to 1500° C.; although a somewhat higher temperature may be employed without serious detriment to the chemical action, it would generally represent a loss of efficiency, e.g. because of undue heat requirement.

It is to be understood that the invention is not limited to the specific procedures herein described, but may be carried out in other ways without departure from its spirit.

I claim:

1. Procedure for purification of alumina to remove soda, comprising advancing alumina in divided form along a predetermined path while supplying heat thereto, for discharge of a calcined product, and introducing into the alumina at a high temperature zone of said path, where the alumina is highly heated, an amount of an additive consisting of a fluoride compound capable of reacting with soda contamination in the alumina to yield a sodium compound removable with the gases from the heated zone, said additive being a substance which has the chemical characteristic of reacting with soda as aforesaid and which is a mineralizer adapted to promote crystalline properties in the calcined alumina.

2. Procedure for purification of alumina to remove soda, comprising advancing alumina along a predetermined path while supplying heat to said path to provide increase of temperature along the same, for calcining the alumina, removing gas from the path separately from the calcined alumina, and introducing into the alumina at a higher temperature region of the path, an amount of a fluoride compound capable of reacting with soda contamination in the alumina to yield a sodium compound which passes into and is removable with the aforesaid gas.

3. Procedure for purification of alumina to remove soda, comprising advancing alumina from one end to the other end of a predetermined path while passing highly heated gas countercurrently to said alumina along said path, for calcining said alumina, removing calcined alumina from said other end of the path, withdrawing the gas from the first end of the path, and introducing into the path at a locality thereof remote from the first end, for intimate contact with the alumina, an amount of an additive consisting of a fluoride compound capable of reacting with soda contamination in the alumina to yield a sodium compound which passes into and is removable with the aforesaid gas, said additive being a substance which has the chemical characteristic of reacting with soda as aforesaid and which is a mineralizer adapted to promote crystalline properties in the calcined alumina.

4. Procedure as defined in claim 3, in which the additive, in divided form, is suspended in the heated gas and is introduced therewith into said path at said other end, for incorporation into the advancing alumina.

5. Procedure as defined in claim 4, in which the additive is aluminum fluoride.

6. Procedure for purification of alumina to remove soda, comprising advancing alumina from the cold end to the hot end of a rotary kiln while introducing highly heated gas at said hot end to travel countercurrently to the alumina in the kiln for calcining the alumina, removing gas from the cold end of the kiln, and introducing into and with said heated gas, for intimate contact with the advancing alumina, an amount of an additive capable of reacting with soda contamination in the alumina to yield a sodium compound which passes into and is removable with the aforesaid gas, said additive being a fluoride compound.

7. Procedure as defined in claim 6, in which the additive is aluminum fluoride.

8. Procedure as defined in claim 6, in which the kiln is direct fired by flame projected into the hot end and supplied with air for combustion, and in which said additive is introduced into the kiln by suspending the additive in the combustion air to the flame.

References Cited in the file of this patent

UNITED STATES PATENTS

| | | |
|---|---|---|
| 1,036,454 | Childs | Aug. 20, 1912 |
| 2,069,060 | Fessler | Jan. 26, 1937 |
| 2,752,301 | Cooper | June 26, 1956 |